(12) United States Patent
Kojiro

(10) Patent No.: US 7,988,562 B2
(45) Date of Patent: Aug. 2, 2011

(54) MIDAIR AND PSEUDO-UNDERWATER OBSERVATION APPARATUS

(76) Inventor: Norio Kojiro, Osaka (JP)

(*) Notice: Subject to any disclaimer, the term of this patent is extended or adjusted under 35 U.S.C. 154(b) by 118 days.

(21) Appl. No.: 12/479,107

(22) Filed: Jun. 5, 2009

(65) Prior Publication Data
US 2010/0105491 A1    Apr. 29, 2010

(30) Foreign Application Priority Data

Oct. 29, 2008  (JP) ................. 2008-301687

(51) Int. Cl.
*A63G 3/02* (2006.01)
*A63G 3/00* (2006.01)

(52) U.S. Cl. ............. 472/13; 472/44; 446/153

(58) Field of Classification Search .......... 472/13, 472/44, 45, 30, 65, 67, 136, 137; 446/153–165
See application file for complete search history.

(56) References Cited

U.S. PATENT DOCUMENTS

| 4,932,558 | A | * | 6/1990 | Katavolos | 220/666 |
| 4,960,275 | A | * | 10/1990 | Magon | 472/13 |
| 5,899,634 | A | * | 5/1999 | Lochtefeld | 405/79 |
| 6,115,974 | A | * | 9/2000 | Milanian | 52/169.2 |
| 6,561,914 | B2 | * | 5/2003 | Henry | 472/13 |

FOREIGN PATENT DOCUMENTS

JP    405154256 A    *  6/1993

* cited by examiner

*Primary Examiner* — Kien T Nguyen
(74) *Attorney, Agent, or Firm* — Ronald E. Greigg

(57) ABSTRACT

The observation apparatus provided with the observation wheel comprises a water tank housing fish and being arranged around the substantially lower half of a rotation locus of the observation wheel in which at least an inside face facing the observation wheel of the water tank is formed of a transparent material.

9 Claims, 7 Drawing Sheets

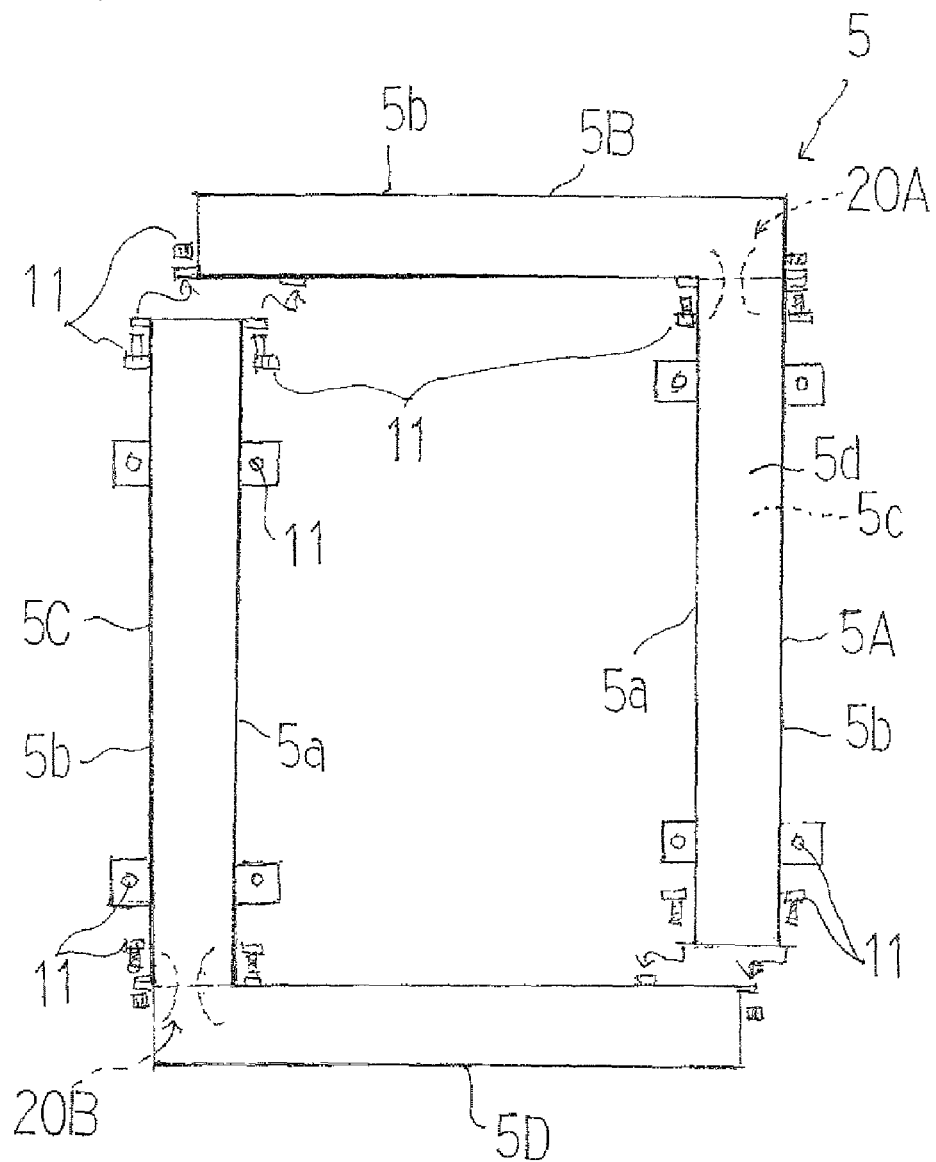

MIDAIR AND PSEUDO-UNDERWATER OBSERVATION APPARATUS

CROSS-REFERENCE TO RELATED APPLICATIONS

This application is based on Japanese Patent Application 2008-301687 filed Oct. 29, 2008, upon which priority is claimed and related to U.S. Ser. No. 11/857,751 filed Sep. 19, 2007.

BACKGROUND OF THE INVENTION

1. Field of the Invention

The present invention relates to a midair and pseudo-underwater observation apparatus installed at a facility, which needs to attract guests and customers like a hotel or a commercial facility, for example, as well as in an amusement park or a theme park.

2. Description of the Prior Art

An observation wheel including a number of gondolas secured to a large circular wheel is to enjoy a view from a high position. Various types of observation wheels are installed and operated, while observation wheels for enjoying only the underwater view, or for enjoying both of the midair view and the underwater view have been proposed since it is considered to be nice to enjoy not only the midair view but also the underwater view and marine life view at the same time in a continuous manner. With this background, it is considered to install the underwater observation wheel, or the underwater and midair observation wheel in an artificial pond of an amusement park, the seashore in a marine park or the like.

The followings are the examples of this kind of underwater and midair observation wheel.

[Patent Document 1] Japanese Patent Publication No. H07-75690.

[Patent Document 2] Japanese Patent Publication No. H05-154256.

One form of a conventional underwater and midair observation wheel is the one in which the gondolas having a hermetically sealed structure move under the water (Patent Document 2), and the other form thereof is the one in which the gondolas have the structure same as that of an ordinary midair observation wheel and a cover is arranged to cover the whole movement locus of the gondolas (Patent Document 1).

In the above-mentioned form in which the gondolas have the hermetically sealed structure, it takes a long time for the large-diameter wheel, which rotates comparatively slowly, to rotate once and return to a position for getting on and off. Therefore, it is necessary to provide a device for supplying oxygen at least during the movement in the water. Equipment for it is expensive and the running cost is incurred. Further, it is dangerous when the level of oxygen increases.

The other conventional underwater and midair observation wheel in which the cover is provided to cover the whole movement locus of the gondolas (Patent Document 1) is structured so that the gondolas may move in a donut-shaped tube-like body. In this structure, there is the problem that a passage for evacuation can not be secured easily being disturbed by the gondolas because of the donut-shaped tube-like body when the observation wheel stops due to an accident. Further, when the cover is damaged in the water causing inundation, the inside of the tube-like body is immersed even when the passengers can go out of the gondolas, which is more dangerous. Since the gondolas move inside the tube-like body also in the air, the passengers are covered with both of the gondolas and the tube-like body, which is made of a transparent material though, the passengers have a cooped-up feeling and are difficult to enjoy the liberating feeling.

To solve the above-mentioned problem, the inventor of this invention proposed to provide an underwater and midair observation apparatus which eliminates a need for the hermetically sealed structure of the gondolas by installing a casing separately from the observation wheel, and enables easy evacuation even when the observation wheel stops due to an accident.

[Patent Document 3] Japanese Patent Publication H2008-100072.

According to the above-mentioned invention, a casing 5 which is open-topped and made of a transparent material is arranged from the underwater to the water surface so that the observation wheel 1 can be operated in the state of being insulated from the water.

The above-mentioned invention was excellent in the sense that the problems in the previous underwater and midair observation apparatuses were solved. However, there is the problem that large-scale construction works like waterproof work or a caisson method for installing the casing in the water is needed, which are very expensive.

Further, since the casing is structured in the sea, a river, a lake or the like as in the conventional cases, there still remains the problem that the surrounding seawater or freshwater endlessly flows into the observation wheel when the casing is broken if the worst case should happen like an earthquake, which is very dangerous.

Furthermore, the place of installation of the observation wheel is limited to the area where there is the seawater or the freshwater like the sea, the river or the lake. Therefore, the observation wheel cannot be installed at an intended place like an urban area with buildings of commercial facilities, or a resort hotel or the like in a desert area etc.

In addition, the passengers of the observation wheel are not surely guaranteed the view of swimming fish or the like when it comes to the natural sea, river or lake, and there is a problem of lack of representation effects as underwater viewing.

SUMMARY OF THE INVENTION

An object of this invention is to provide a midair and pseudo-underwater observation apparatus facilitating installation work and enabling its installation at an intended place like an urban area with buildings or a desert area, while enabling both of the underwater and midair viewing.

To achieve the above-mentioned object, the midair and pseudo-underwater observation apparatus of this invention, including supporting legs erected on a foundation and an observation wheel mounted on the supporting legs in a manner of rotating around a rotational axis, comprises a water tank housing fish and being arranged around a substantially lower half of a rotation locus of the observation wheel, in which at least an interior wall means of the water tank facing the observation wheel is formed of a transparent material.

The foundation for erecting the supporting legs as referred to in this invention includes a structure like a building as well as the ground.

The observation wheel as referred to in this invention includes all types of conventionally known observation wheels in which a number of gondolas are hung. However, the rotational axis may be a single axial or biaxial. The observation wheel may not have a shape of a wheel with a large diameter but may be the one in which the gondolas are rotated by a conveyor system, taking the locus of an ellipse or an oval.

The water tank as referred to in this invention is a structure capable of holding freshwater, seawater, or both. The shape of the water tank may be a rectangular, an ellipse, an oval, a shape like a track of an athletic field, etc. in plan view. The water tank may have a side face, which is partly deformed to bypass the supporting legs and come closer to the gondolas. The front view may be an appropriate shape like a rectangular. The transparent material is a strong transparent material like reinforced glass or reinforced plastic. The water tank may comprise a single area only for the seawater for example, or may be separated into a plurality of areas for freshwater, seawater and the area without any liquid in it, namely, an area only for artificial objects like artificial reefs.

The substantially lower half of the rotation locus as referred to in this invention means the area lower than the horizontal line passing the rotational axis, while it also includes a substantially half of the rotation locus.

BRIEF DESCRIPTION OF THE DRAWINGS

The Drawing show an embodiment of this invention in which:

FIG. 7 is an assembly/disassembly plan view showing another embodiment of the water tank of the midair and pseudo-underwater observation apparatus of this invention.

PREFERRED EMBODIMENTS OF THE INVENTION

Figure 1:
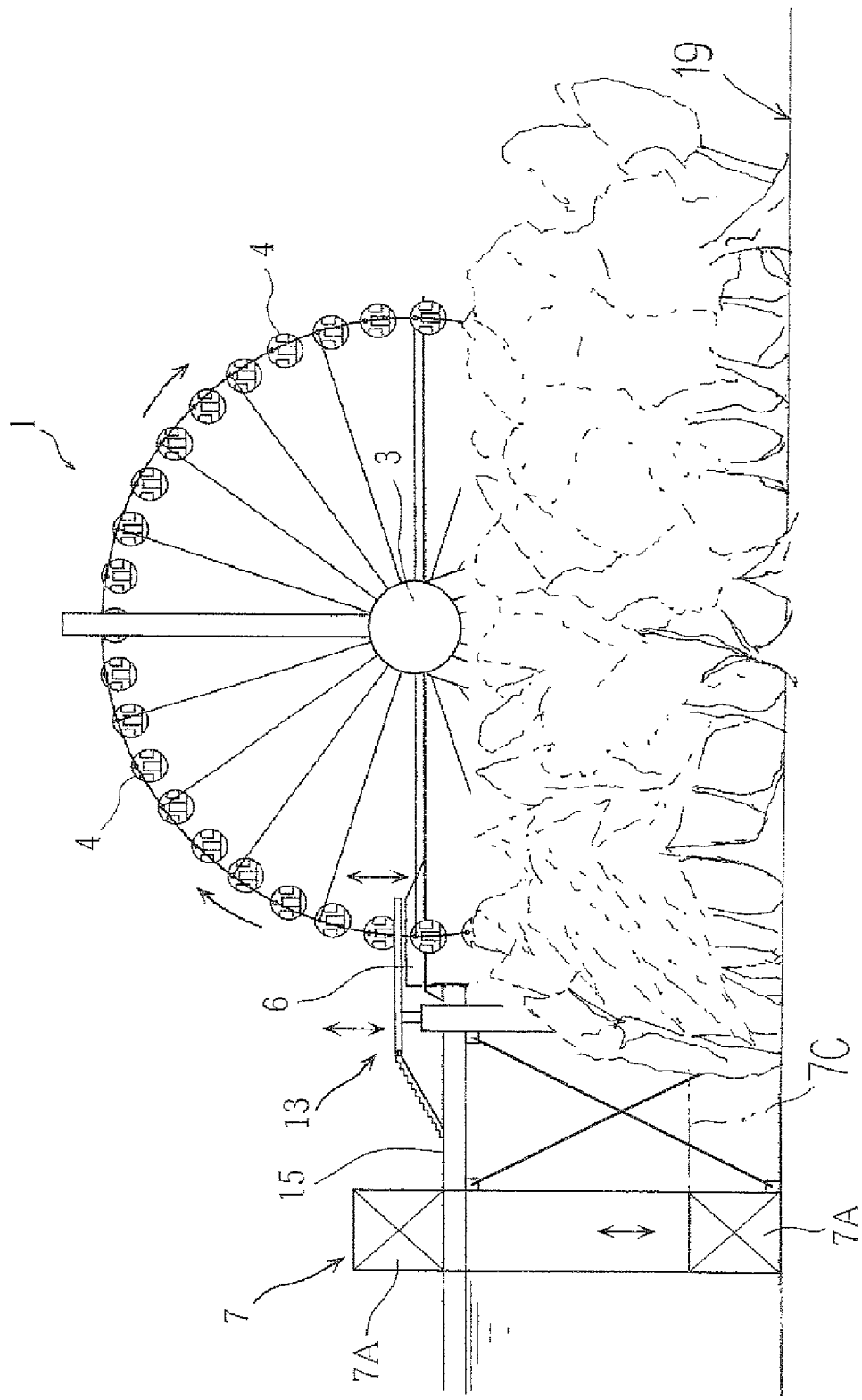
FIG. 1 is a front view of the midair and pseudo-underwater observation apparatus of this invention.
Figure 2:
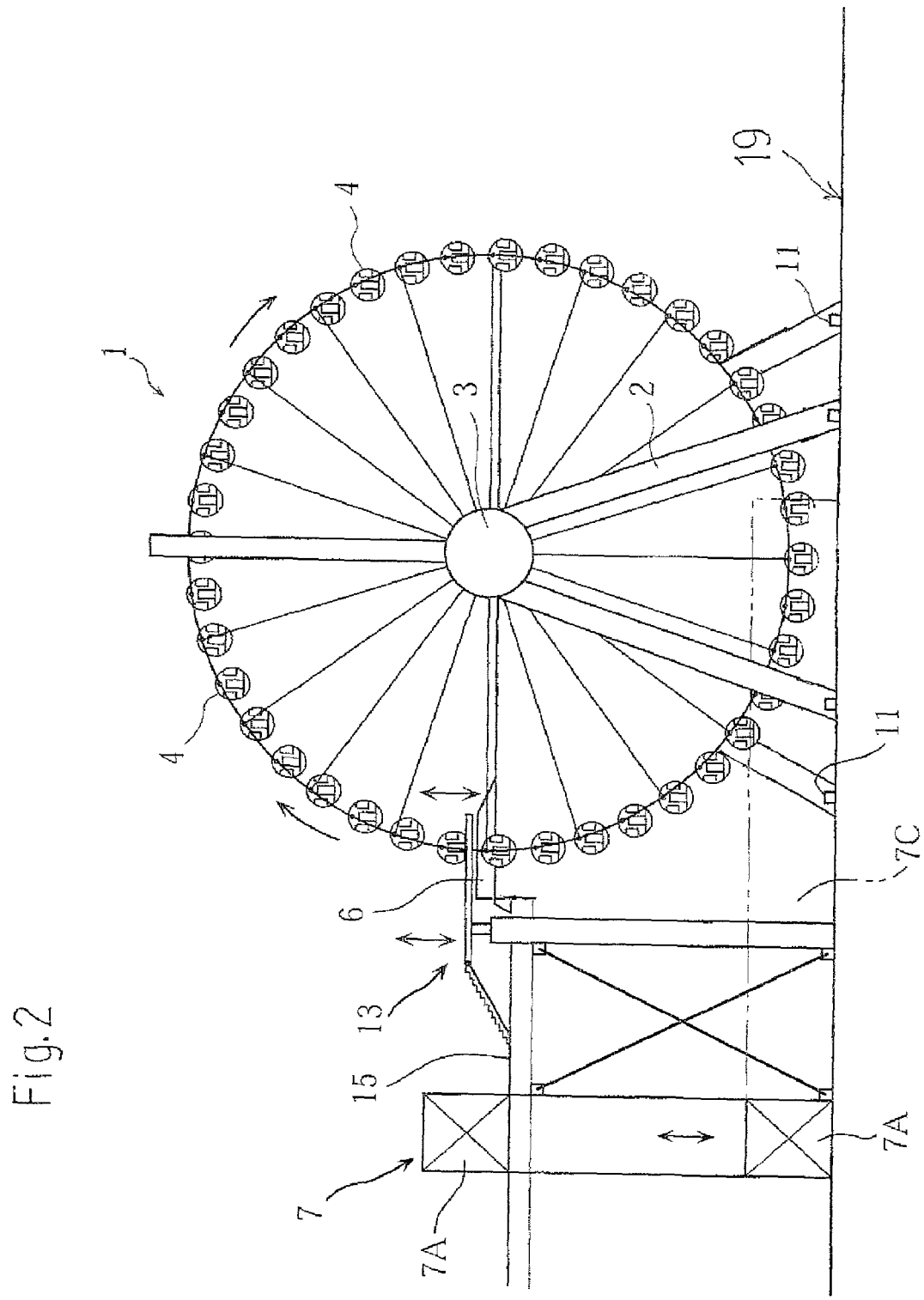
FIG. 2 is a front view showing the state that the natural objects covering the midair and pseudo-underwater observation apparatus of this invention and the water tank are removed.

Preferred embodiments of a midair and pseudo-underwater observation apparatus according to this invention are described in detail hereinafter based on the drawings. FIG. 2 shows a state that natural objects like trees and a water tank shown in FIG. 1, are removed. The embodiment explained here is the midair and pseudo-underwater observation apparatus, which is installed in a resort hotel in an oasis of a desert area, for example. To enable materialization of the midair and pseudo-underwater viewing under the locational conditions of deficient water or lack of the ocean provides dramatic representation effects.

As shown in FIGS. 1 and 2, supporting legs 2 such as steel structures are erected on a foundation structure 19, and an observation wheel 1 is mounted on the supporting legs 2 in a manner of rotating around a rotational axis 3. The observation wheel 1 is driven by an electric motor, and a number of gondolas 4 are pivotally connected to a large diameter wheel, having a diameter of 80 m, for example in this embodiment, in a hanging manner, and are rotated at a low speed. Since this structure is substantially same as the conventional and publicly-known structure of an observation wheel generally installed on the ground, details are not explained here.

The water tank 5 housing fish is arranged around a substantially lower half of a rotation locus of the observation wheel 1.

In this embodiment, the height of the water tank 5 is 38 m measuring from the bottom part, and the lengths of the longer side and the shorter side, or the width in other words, of the water tank 5 in plan view are about 44 m and about 5 m, respectively. The water tank 5 has the structure that double ellipses having a shape of a track in plan view are formed leaving a clearance of 0.5 m to 1 m from the locus of the movement of the gondolas 4 of the observation wheel 1, and the inside thereof is filled with freshwater or seawater. The width of the water tank 5 is set to be as narrow as 1 m here so that the amount of water to be filled can be minimized and that manufacturing thereof can be facilitated structurally. Needless to say, the width of the water tank 5 is a matter of design, and therefore an intended width may be set within a structurally allowable range of the load of the water amount.

Seawater life or freshwater life like fish or turtles, which will be described later in detail, are released in the water tank 5, and reefs, marine plants, river constituent objects or the like are arranged in it.

An interior wall means 5a of the water tank 5 facing the observation wheel 1 is formed of the transparent material, while a reinforced transparent glass is used in this embodiment, and an exterior wall means 5b is formed of reinforced concrete whose interior side is finished to be suitable as the sight of the sea, for example. As a matter of course, a transparent or translucent reinforced plastic may be used instead of the glass.

Figure 3:
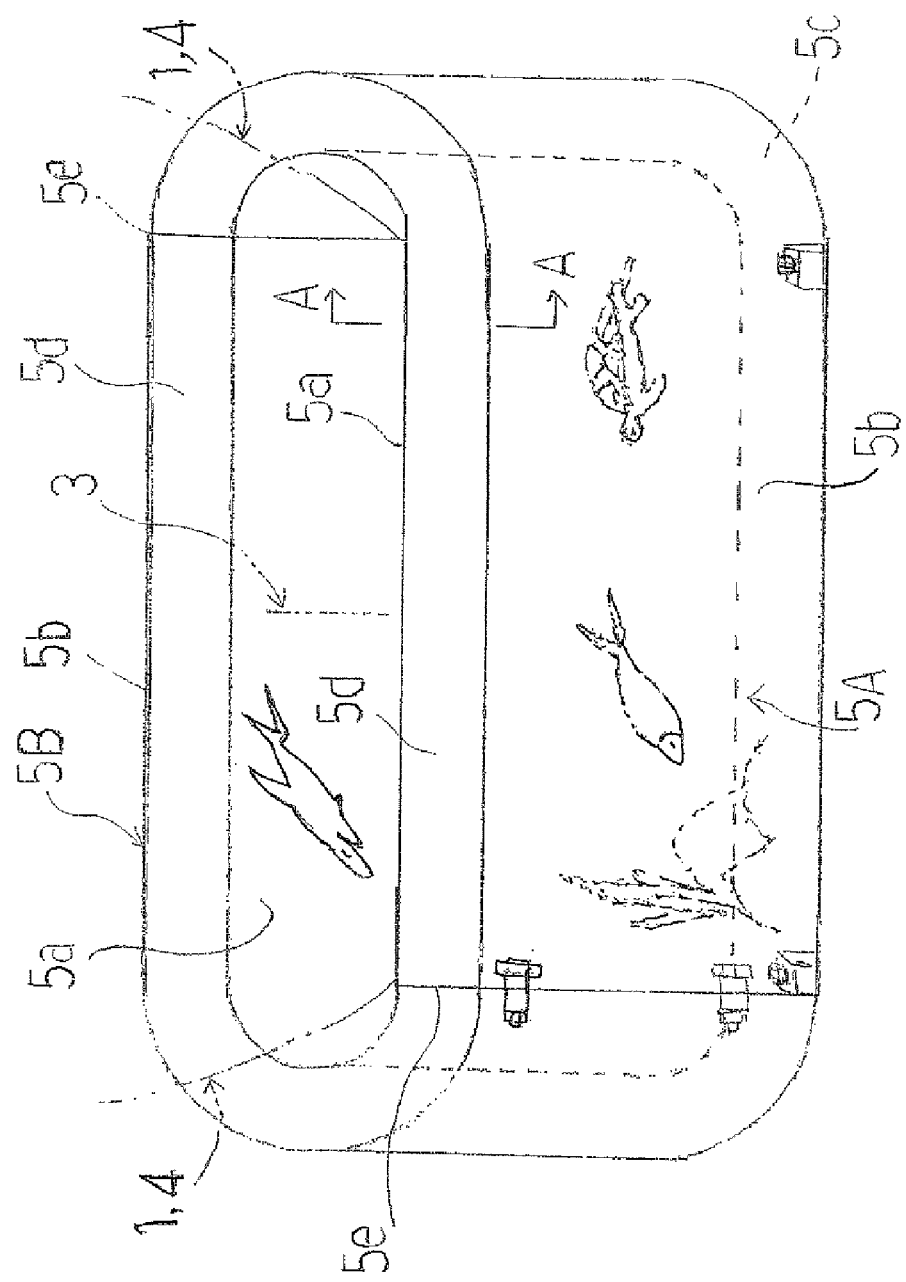
FIG. 3 is a perspective view showing the water tank of the midair and pseudo-underwater observation apparatus of this invention.
Figure 4:
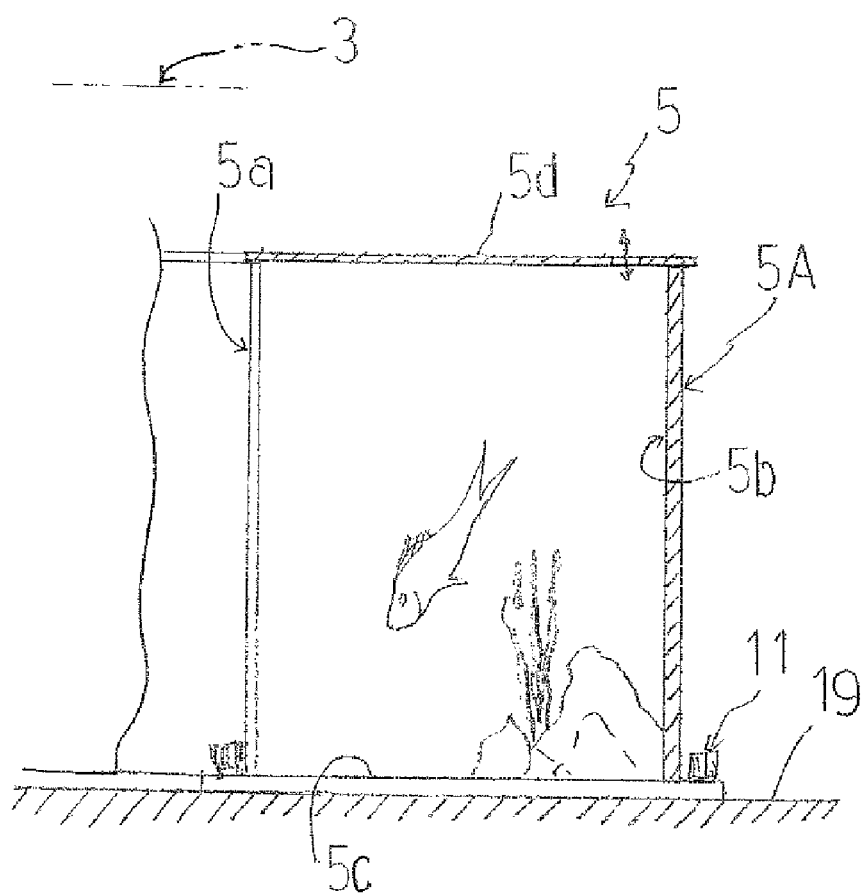
FIG. 4 is an A-A cross sectional view of the water tank of the midair and pseudo-underwater observation apparatus of this invention shown in FIG. 3.

As shown in FIGS. 3 and 4, the water tank 5 is separated into two blocks 5A, 5B each of which comprises the interior wall means 5a, the exterior wall means 5b, and a concrete bottom wall means 5c. The blocks 5A, 5B are connected to each other by joining the exterior wall means 5b and the bottom wall means 5c of each of the blocks 5A, 5B with bolts 11, and the interior wall means 5a are joined by transparent resin joints 5e.

In this embodiment, each of the adjacent blocks 5A, 5B is formed to have a J-letter shape in plan view, and they are connected to each other face to face to form an ellipse having a shape of a track. The upper part of the water tank 5 is covered with a cover body 5d to prevent the fish from jumping out, and trash, fallen leaves, etc. from entering from the above. The cover body 5d has vent holes opened to the outside air. In this embodiment, the cover body 5d is formed of a resin material, which is optically semi-transparent, though it may be formed of a nontransparent metal plate or a net-like body.

The pair of blocks 5A, 5B do not have a partition wall and a single area is formed in this embodiment, where saltwater fish swim, and sea bed structures like marine plants or reefs are arranged in it. The water tank 5 may be of course partitioned into two blocks 5A, 5B, which are connected to each other by tunnel-like paths so that the saltwater fish may freely come and go between the two areas. The seawater or the freshwater is circulated by a pump in each of the blocks, or the air is sent to them so that oxygen may be smoothly supplied to the fish, though a drawing thereof is omitted here.

The exterior wall means 5b of the water tank 5, or in other words, the exterior wall means 5b of each of the blocks 5A, 5B is formed of an opaque material. In this embodiment, the exterior wall means 5b is structured using the reinforced concrete lined with a mirror.

The part lined with the mirror reflects the swimming fish, resulting in the representation effects which give the inside of the water tank 5 spacious impression. Consequently, even when the width of the water tank 5 in plan view is around 1 m, the water tank 5 looks large when seen from the gondolas 4 of the observation wheel 1, and the sense of reality of the pseudo-underwater observation is improved.

The exterior wall means 5b of the water tank 5 is covered with natural objects or artificial structures so that it cannot be seen from the outside.

Here, as shown in FIG. 1, trees, or evergreen trees preferably, shown by imaginary lines are arranged as the natural objects, by which the water tank 5 cannot be seen from the outside. Consequently, passengers get on the observation wheel 1 without being able to imagine the pseudo-underwater observation with a sense of reality in advance whereby the representation effects are enhanced by the unexpected pseudo-underwater observation continued from the midair observation. Needless to say, the exterior wall means 5b of the water tank 5 may be structured in a manner of hiding behind a part of artificial construction like a play facility or a hotel.

Figure 5:
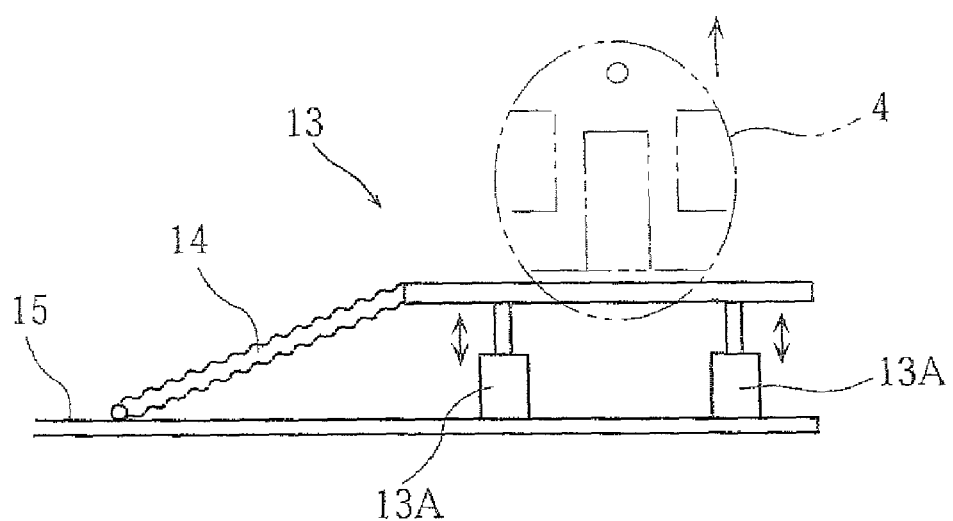
FIG. 5 is a simplified front view of the getting on and off mechanism of the midair and pseudo-underwater observation apparatus of this invention.

As shown in FIGS. 1 and 5, an ascending and descending part with respect to the observation wheel 1 is arranged at the position lateral to the rotational axis 3 and on the ascending side.

Namely, a getting on and off step 6 is arranged to face the position of the observation wheel 1 above the water tank 5 and where an element of vertical movement is large. The getting on and off step 6 is structured to move upward at a speed synchronous with a rotational speed of the observation wheel 1 in a direction of the rotation by a predetermined rotational angle, and move downward at an intended speed.

In the case of a general observation wheel, since a predetermined time of about 6 to 10 seconds can be secured at the lowermost position for a horizontal movement in the direction of a tangential line of the wheel, the passengers can easily get on the gondolas 4 during the substantially horizontal movement. In the case where a half of the wheel is positioned underwater, the passengers get on and off the gondolas 4 at the position near the water surface of the water tank 5. Needless to say, there is no problem even when the passengers get on and off at the bottom of the water. The passengers virtually cannot get on and off the gondolas 4 while moving in a vertical direction since the gondolas 4 in this embodiment move upward, or in other words in a rightward rotational direction in front view.

In this embodiment, in order to solve the problem, a getting on and off mechanism 13 is provided in a manner that the getting on and off step 6 is moved up by a hydraulic cylinder 13A at a speed synchronous with the rotational speed of the observation wheel 1 in the direction of the rotation by the predetermined rotational angle. Descending movement of the getting on and off step 6 to return to the original position is performed at a higher speed. The passengers get on the getting on and off step 6 at the descended position. When a target gondola of the gondolas 4 comes, the getting on and off step 6 is moved up by the hydraulic operation by a predetermined height at the speed synchronous with the rotational speed of the observation wheel 1.

During the upward movement, there is no relative displacement between the target gondola and the passenger, wherefore getting on and off are facilitated. In the drawings, 14 shows an extensible slope connecting the getting on and off step 6 to an outside fixed passage 15. The extensible slope 14 comprises a number of floor members, which are connected together by chains so that it may follow the ascending and descending movements of the getting on and off step 6. Needless to say, the extensible slope 14 may be eliminated and the passengers may move to an outside passage or the like when the getting on and off step 6 is lowered. In the meantime, the getting on and off mechanism 13 as mentioned above may be operated by using a mechanical means which can easily control the ascending and descending speed, like a screw shaft or a gear wheel instead of using the hydraulic cylinder 13A.

On this occasion, the getting on and off step 6 may be arranged on each of both sides of the gondolas 4 to enable getting on and off from both sides of the gondolas 4 so that the passengers may get off at the position lower than a position lateral to the rotational axis 3 and may get on at the upper position. Each getting on and off step 6 may be driven to move up and down individually.

The passengers reach the getting on and off step 6 from the ground by using an elevator 7. In FIG. 1, 7A shows an entrance and exit of the elevator 7. The elevator 7 may be the type which is installed in a general building or the like. When the observation wheel 1 is installed adjacent to a structure like a hotel, some of the elevators of the hotel may be used also for the observation wheel 1.

In the drawing, 7C shows a passage in a shape of a tunnel where people can walk on the bottom when they move up from or down to the bottom of the observation wheel 1, as the need arises, so that they can move up or down using the elevator 7.

Further, as shown in FIG. 2, a plurality of lighting apparatuses 16 like lights for lighting up the inside of the water tank 5 are arranged on the supporting legs 2, in this embodiment.

The lighting apparatuses 16 like lights may be arranged on any places like the water tank 5 as well as the supporting legs 2.

Thus, the illumination effect of the lighting apparatuses 16 like colored lights creates an impressive look of the underwater and enhances the representation effects.

Needless to say, even when natural light is weak or there is no natural light like on cloudy days, at nights etc., the underwater is lit so that swimming fish can be seen easily.

Moreover, the gondolas 4 of the observation wheel 1 are provided with acoustic devices 18, respectively. In this embodiment, sound reproduction devices like speakers are arranged so that desired sound or music may be transmitted from the outside. On this occasion, general guidance or narration on the view may also be transmitted for broadcast.

Next, another embodiment of the water tank 5 which is partly deformed is explained. The structural part, which is not described in the following explanation, is the same as that of the above-mentioned water tank 5.

Figure 6:
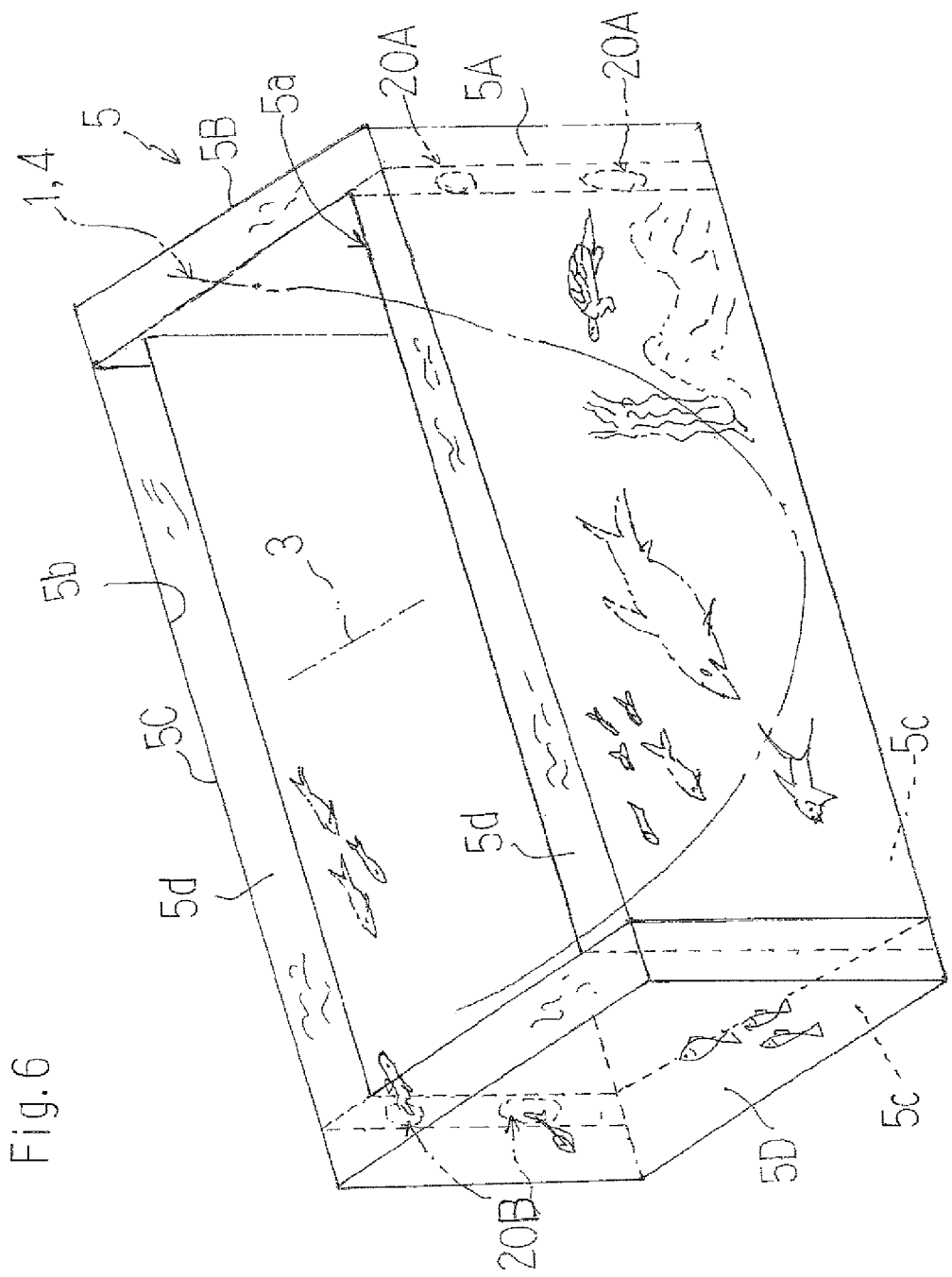
FIG. 6 is a perspective view showing another embodiment of the water tank of the midair and pseudo-underwater observation apparatus of this invention.

FIGS. 6 and 7 show the water tank 5 which is partitioned into a plurality of blocks 5A, 5B, 5C, 5D in plan view. The blocks 5A, 5B, 5C, 5D are connected with one another by bolts 11. Needless to say, since the interior wall means 5a of the blocks 5A, 5B, 5C, 5D are formed of the transparent material, these are connected by the intermediary of a transparent resin or a resin packing instead of the bolts.

In this embodiment, the large blocks 5A, 5C to be placed on the side faces of the observation wheel 1 and the small blocks 5B, 5D to be placed on the peripheral faces of the observation wheel 1 are connected to each other, respectively, by bolts 11 so that they may form L-letter shapes respectively in plan view, and that they may form double rectangles in plan view. The width of the respective double rectangles in plan view, or in other words, the width of the water tank 5 is set to be as narrow as 1 m, here, so that the amount of water to be filled may be reduced as much as possible and that the water tank 5 may be manufactured structurally easily. Needless to add, the width of the water tank 5 is a matter of designing and an intended width may be set within the structurally allowable range of the load of the water amount.

In this embodiment, the adjacent blocks 5A, 5B are connected to each other in a manner of forming an L-letter shape in plan view and the other adjacent blocks 5C, 5D are also connected to each other in a manner of forming the L-letter shape in plan view. The blocks 5A, 5B are partitioned and structured in a manner of intercommunicating through a pair of tunnel passages 20A which are vertically arranged in this embodiment, and the blocks 5C, 5D are partitioned and structured in a manner of intercommunicating through a pair of tunnel passages 20B which are arranged vertically in this embodiment. The blocks 5A, 5B, 5C, 5D are fixed to the foundation structure 19 by anchor bolts 11A, respectively. The blocks 5A, 5B, 5C, 5D may also be structured independently, of course, and are communicated to each other through tunnel passages.

The pair of blocks 5A, 5B house the saltwater fish and the other pair of blocks 5C, 5D house the freshwater fish. Sea bed structures like marine plants and reefs, or the structure including the landscape of river beds or waterfalls are arranged in the blocks 5A, 5B, 5C, 5D. Needless to say, all blocks 5A, 5B, 5C, 5D may be mutually connected through tunnel passages 20A, 20B allowing only the saltwater fish to freely swim in an intercommunicating manner. In this embodiment, the saltwater or the freshwater is circulated in each of the blocks by using a pump, and the air is sent into them, so that oxygen may be smoothly supplied to the fish, though the drawing for it is omitted here.

PREFERABLE MODES FOR EMBODYING THE INVENTION

In this invention, the water tank 5 preferably comprises at least two blocks 5A, 5B in plan view and these are arranged independently in a manner that horseshoe-shaped objects in plan view are arranged face to face at an interval at the position corresponding to the supporting legs, or these are connected to each other.

By separating the water tank 5 in this manner, the structure can be simplified. In the case that the tank 5 comprises two blocks, the blocks having a J-letter shape or an L-letter shape in plan view are connected to each other, and in the case that the tank 5 comprises four blocks, four simple rectangular solid blocks are connected to form an assembled structural body, for example. Consequently, manufacturing, transportation and installation are facilitated.

The water tank 5 is transported in a separated state, so that the separated segments may easily be assembled into the tank by transporting the separated segments closer to the existing observation wheel from the surrounding area.

An exterior wall means 5b of the water tank 5 is preferably formed of an opaque material.

By forming the exterior wall means 5b of the water tank 5 with the opaque material like this, the passengers of the gondolas of the observation wheel can concentrate on viewing the underwater without seeing the outside view of the exterior wall means 5b of the water tank 5, so that pseudo-underwater experience can be made more realistic.

Only part of the exterior wall means 5b of the water tank 5 may of course be formed of the opaque material and the transparent material may also be used in combination.

Further, the exterior wall means 5b of the water tank 5 is preferably covered with natural objects or an artificial structure so that it may be hidden from the sight of the outside.

With the above-mentioned structure, the water tank 5 cannot be seen from the outside before riding in the observation wheel. Consequently, the passengers can experience the underwater viewing without making a prediction on how realistic the underwater viewing is, by which the sense of the reality is improved even through it is pseudo-experience.

The water tank 5 can be hidden from the sight of the outside by arranging, around the water tank 5, clumps of trees, or evergreen trees preferably, flowerbeds, artificial hills, etc., for example, as the natural objects, or by covering the water tank 5 with a building wall, an amusement facilities or the like as the artificial structure.

Further, at least an inner surface of the exterior wall means 5b of the water tank 5 is preferably formed to have a mirror finished surface.

By providing the mirror finished surface, even when the water tank 5 is designed to have a small depth, the fish images etc. reflected in the mirror give an impression that the water tank 5 has a large depth, so that effects of an underwater sensation may be enhanced and a sense of reality may be improved.

The above-mentioned mirror finished surface may be obtained by laying a mirror (glass and mercury deposition) on a concrete exterior wall, or by forming an exterior wall using a metal plate which is finished to have a mirror-like surface or is finished by laying thereon a material like an aluminum foil reflecting lights. The surface of the exterior wall means 5b of the water tank 5 is made to be parallel to the observation wheel 1 in plan view, or to have an L-letter shape, a circular-arc shape, a wave shape, etc. in plan view, which is apt to give the visual impression of deeper perspective.

Further, the water tank 5 is preferably separated into a saltwater fish block 5A and a freshwater fish block 5B.

Thus, by structurally separating the water tank 5 and categorizing the fish etc. swimming here into freshwater life and seawater life, the passengers can enjoy the underwater view in two ways.

When a plurality of blocks for freshwater fish and a plurality of blocks for saltwater fish are arranged, the blocks for the same group of fish are preferably connected with each other by a pipe-like tunnel, for example, so that the fish can freely pass.

An ascending and descending part with respect to the observation wheel 1 is preferably arranged at a position lateral to the rotational axis 3 and on the ascending side.

With this structure, the passengers first enjoy midair viewing like the one they have experienced, and then can enjoy unexperienced pseudo-underwater viewing, by which an effect of an element of surprise can be enhanced.

A getting on and off step 6 is arranged to face the position above the water tank 5 of the observation wheel 1 and where an element of vertical movement is large. The getting on and off step 6 is preferably structured so that it may move upward at a speed synchronous with the rotational speed of the observation wheel 1 in the direction same as the rotation by a predetermined rotational angle, and may move downward at an intended speed.

With this structure, there is an advantage that passengers can easily get on and off the observation wheel at the position where the element of the vertical movement is large, or in other words, at a substantially lateral position.

A plurality of lighting apparatuses 16 are preferably arranged to light up the inside of the water tank 5.

By arranging the lighting apparatuses 16, the underwater can be lit sufficiently brightly even on cloudy days, in evenings and at nights, so that the passengers can enjoy the pseudo-underwater viewing. At the same time, representation effects can be added by the lighting. The lighting includes colored lights and laser beams.

The gondolas 4 of the observation wheel 1 are preferably provided with acoustic devices 18, respectively.

By providing the acoustic devices 18, the passengers can enjoy midair and underwater viewing while listening to the music that they like.

For example, the acoustic devices 18 may be sound reproducing devices by which wired or wireless signals of music or the like are transmitted from the outside, and different kinds of music, acoustic effect, guidance on fish, etc. can be provided for each of the midair viewing and the pseudo-underwater viewing.

Further, the acoustic devices 18 mounted on the gondolas 4 may be the ones which are needed to select and play the music or the sound that the passengers like instead of the ones for transmitting the music or sound from the outside.

INDUSTRIAL VERSATILITY

The midair and pseudo-underwater observation apparatus of this invention can be materialized under intended locational conditions irrespective of the existence of a natural river, a lake or the sea, and can be installed in a resort area of a desert area or the like where there is less water, wherefore the range of application is wide.

ADVANTAGE OF THE INVENTION

This invention can be materialized by simple works of installing the water tank without a need for large-scale and expensive installation works like waterproofing or a caisson method. Consequently, the invention can be materialized not only by refurbishing an existing observation wheel but also installing a new observation wheel. The observation apparatus can also be installed easily on intended places like a rooftop of a building in an urban area or a resort hotel etc. in a desert area or the like. Passengers can enjoy pseudo-underwater view at a place without water while enjoying the midair view, too. Since swimming fish are released in the water tank for the pseudo-underwater observation, the passengers can surely enjoy the swimming fish as if they are in an aquarium without waiting for fish coming to them by chance, which is unsure as in a conventional case.

Even if the water tank should be broken, only a limited amount of water spreads around the water tank without allowing an unlimited amount of water to flow to the observation wheel as in the case of natural river or sea, and therefore there is an advantage that the risk of drowning can be prevented.

I claim:

1. A midair and pseudo-underwater observation apparatus provided with supporting legs erected on a foundation and an observation wheel mounted on the supporting legs in a manner of rotating around a rotational axis comprising;
    a water tank arranged around a substantially lower half of a locus of rotation of the observation wheel to house fish, in which at least an interior wall means of the water tank facing the observation wheel is formed of a transparent material, wherein the water tank comprises at least two blocks in plan view, which are arranged independently or connected to each other, and are positioned so that the observation wheel passes between them.

2. The midair and pseudo-underwater observation apparatus as claimed in the claim 1, in which the water tank is separated into a saltwater fish block and a freshwater fish block.

3. The midair and pseudo-underwater observation apparatus as claimed in the claim 1, which an ascending and descending part with respect to the observation wheel is provided at the position lateral to the rotational axis and on the ascending side.

4. The midair and pseudo-underwater observation apparatus as claimed in the claim 1, in which a plurality of lighting apparatuses lighting up the inside of the water tank are arranged.

5. The midair and pseudo-underwater observation apparatus as claimed in the claim 1, comprising gondolas, provided with acoustic devices.

6. A midair and pseudo-underwater observation apparatus provided with supporting legs erected on a foundation and an observation wheel mounted on the supporting legs in a manner of rotating around a rotational axis comprising;
    a water tank arranged around a substantially lower half of a locus of rotation of the observation wheel to house fish, in which at least an interior wall means of the water tank facing the observation wheel is formed of a transparent material, wherein
    the water tank comprises at least two blocks in plan view, which are arranged independently or connected to each other, and wherein an exterior wall means of the water tank is formed of an opaque material.

7. The midair and pseudo-underwater observation apparatus as claimed in the claim 6, in which the exterior wall means of the water tank is covered with natural objects or artificial structures to be hidden from the sight of the outside.

8. The midair and pseudo-underwater observation apparatus as claimed in the claim 6, in which at least an inner surface of the exterior wall means of the water tank is formed to have a mirror finished surface.

9. A midair and pseudo-underwater observation apparatus provided with supporting legs erected on a foundation and an observation wheel mounted on the supporting legs in a manner of rotating around a rotational axis comprising;
    a water tank arranged around a substantially lower half of a locus of rotation of the observation wheel to house fish, in which at least an interior wall means of the water tank facing the observation wheel is formed of a transparent material, wherein
    the water tank comprises at least two blocks in plan view, which are arranged independently or connected to each other, and wherein a getting on and off step arranged to face the position above the water tank of the observation wheel and where an element of a vertical movement is large is structured so that it may move upward at a speed synchronous with the rotational speed of the observation wheel in the direction same as that of the rotation by a predetermined rotational angle, and may move downward at an intended speed.

* * * * *